US005616368A

United States Patent [19]

Jin et al.

[11] Patent Number: 5,616,368

[45] Date of Patent: Apr. 1, 1997

[54] FIELD EMISSION DEVICES EMPLOYING ACTIVATED DIAMOND PARTICLE EMITTERS AND METHODS FOR MAKING SAME

[75] Inventors: Sungho Jin, Millington; Gregory P. Kochanski, Dunellen; Wei Zhu, North Plainfield, all of N.J.

[73] Assignee: Lucent Technologies Inc., Murray Hill, N.J.

[21] Appl. No.: 381,375

[22] Filed: Jan. 31, 1995

[51] Int. Cl.[6] .............................. B05D 5/00; H05H 1/00; B01J 3/06

[52] U.S. Cl. .............................. 427/535; 427/562; 427/577; 427/77; 427/122; 427/197; 427/202; 427/242; 423/446; 216/67; 216/81

[58] Field of Search .............................. 427/535, 575, 427/569, 577, 77, 122, 197, 202, 450, 562, 213, 242; 423/446; 216/67, 81

[56] References Cited

U.S. PATENT DOCUMENTS

| | | | |
|---|---|---|---|
| 4,767,517 | 8/1988 | Hiraki et al. | 204/192.25 |
| 4,874,981 | 10/1989 | Spindt | 427/77 |
| 4,940,916 | 7/1990 | Borel et al. | 313/306 |
| 4,957,591 | 9/1990 | Sato et al. | 427/535 |
| 5,019,003 | 5/1991 | Chason | 427/77 |
| 5,129,850 | 7/1992 | Kane et al. | 445/24 |
| 5,131,941 | 7/1992 | Lemelson | 75/10.19 |
| 5,138,237 | 8/1992 | Kane et al. | 315/349 |
| 5,234,723 | 8/1993 | Babacz | 427/535 |
| 5,283,500 | 2/1994 | Kochanski | 315/58 |
| 5,463,271 | 10/1995 | Geis et al. | 313/346 R |
| 5,474,808 | 12/1995 | Aslam | 427/577 |
| 5,925,701 | 5/1990 | Jansen et al. | 427/99 |

OTHER PUBLICATIONS

Dec. 1991 issue of *Semiconductor International,* p. 46 5 page article "Flat Panel Displays: What's All The Fuss About?".

C. A. Spindt et al. "Field–Emitter Arrays for Vacuum Microelectronics," *IEEE Transactions on Electron Devices,* vol. 38, pp. 2355–2363 (1991) Oct.

J. Brodie et al, *Advances in Electronics and Electron Physics* edited by P.W. Hawkes, vol. 83, pp. 75–87 (1992) no month.

J. A. Costellano, *Handbook of Display Technology* Academic Press, NY, pp. 254–257 (1992) no month.

Okano et al., "Fabrication of a diamond field emitter array", *Appl. Phys. Lett,* vol. 64, pp. 2742–2744 (1994) May.

R. Hawley, *Vacuum,* vol. 18, pp. 383–388 (1968). No Month "Solid Insulators in Vacuum: A Review (invited paper)".

*Primary Examiner*—Marianne Padgett

[57] ABSTRACT

In accordance with the present invention, a field emission device is made by pre-activating ultra-fine diamond particles before applying them to the device substrate. This initial pre-activation increases manufacturing speed and reduces cost and reduces potential damage to the device substrate from exposure to high temperature hydrogen plasma.

13 Claims, 3 Drawing Sheets

FIELD EMISSION DEVICES EMPLOYING ACTIVATED DIAMOND PARTICLE EMITTERS AND METHODS FOR MAKING SAME

FIELD OF THE INVENTION

This invention pertains to field emission devices and, in particular, to field emission devices, such as flat panel displays, using activated ultra-fine diamond particle material with enhanced electron emission characteristics.

BACKGROUND OF THE INVENTION

Field emission of electrons into vacuum from suitable cathode materials is currently the most promising source of electrons in vacuum devices. These devices include flat panel displays, klystrons, traveling wave tubes, ion guns, electron beam lithographic apparatus, high energy accelerators, free electron lasers, electron microscopes and microprobes. The most promising application is the use of field emitters in thin matrix-addressed flat panel displays. See, for example, the December 1991 issue of *Semiconductor International*, p. 46; C. A. Spindt et at., *IEEE Transactions on Electron Devices*, vol. 38, p. 2355 (1991); I. Brodie and C. A. Spindt, *Advances in Electronics and Electron Physics*, edited by P. W. Hawkes, vol. 83, pp. 75–87 (1992); and J. A. Costellano, *Handbook of Display Technology*, Academic Press, New York, pp. 254 (1992), all of which are incorporated herein by reference.

A typical field emission device comprises a cathode including a plurality of field emitter tips and an anode spaced from the cathode. A voltage applied between the anode and cathode induces the emission of electrons towards the anode.

A conventional electron field emission flat panel display comprises a flat vacuum cell having a matrix array of microscopic field emitters formed on a cathode of the cell (the back plate) and a phosphor coated anode on a transparent front plate. Between cathode and anode is a conductive element called a grid or gate. The cathodes and gates are typically skewed strips (usually perpendicular) whose regions of overlap define pixels for the display. A given pixel is activated by applying voltage between the cathode conductor strip and the gate conductor. A more positive voltage is applied to the anode in order to impart a relatively high energy (400–3,000 eV) to the emitted electrons. See, for example, U.S. Pat. Nos. 4,940,916; 5,129,850; 5,138,237 and 5,283,500, each of which is incorporated herein by reference.

Ideally, the cathode materials useful for field emission devices should have the following characteristics:

(i) The emission current is advantageously voltage controllable, preferably with drive voltages in a range obtainable from off-the-shelf integrated circuits. For typical device dimensions (1 μm gate-to-cathode spacing), a cathode that emits at fields of 25 V/μm or less is suitable for typical CMOS circuitry.

(ii) The emitting current density is advantageously in the range of 0.1–1 mA/mm$^2$ for flat panel display applications.

(iii) The emission characteristics are advantageously reproducible from one source to another, and advantageously stable over a long period of time (tens of thousands of hours).

(iv) The emission fluctuation (noise) is advantageously small so as not to limit device performance.

(v) The cathode is advantageously resistant to unwanted occurrences in the vacuum environment, such as ion bombardment, chemical reaction with residual gases, temperature extremes, and arcing; and (vi) The cathode is advantageously inexpensive to manufacture, without highly critical processes, and is adaptable to a wide variety of applications.

Previous electron emitters were typically made of metal (such as Mo) or semiconductor (such as Si) with sharp tips in nanometer sizes. Reasonable emission characteristics with stability and reproducibility necessary for practical applications have been demonstrated. However, the control voltage required for emission from these materials is relatively high (around 100 V) because of their high work functions. The high voltage operation aggravates damaging instabilities due to ion bombardment and surface diffusion on the emitter tips and necessitates high power densities to produce the required emission current density. The fabrication of uniform sharp tips is difficult, tedious and expensive, especially over a large area. In addition, the vulnerability of these materials to ion bombardment, chemically active species and temperature extremes is a serious concern.

Diamond is a desirable material for field emitters because of its negative electron affinity and its robust mechanical and chemical properties. Field emission devices employing diamond field emitters are disclosed, for example, in U.S. Pat. Nos. 5,129,850 and 5,138,237 and in Okano et al., *Appl. Phys. Lett.*, vol. 64, p. 2742 (1994), all of which are incorporated herein by reference. Flat panel displays which can employ diamond emitters are disclosed in co-pending U.S. patent applications Ser. No. 08/220,077 filed by Eom et al on Mar. 30, 1994 (abandoned); Ser. No. 08/299,674 filed by Jin et al. on Aug. 31, 1994 (Issued as U.S. Pat. No. 5,504,385, on Apr. 2, 1996); Ser. No. 08/299,470 filed by Jin et at. on Aug. 31, 1994; Ser. No. 08/331458 filed by Jin et at. on Oct. 31, 1994; Ser. No. 08/332179 filed by Jin et at. on Oct. 31, 1994; and Ser. No. 08/361616 filed by Jin et al. Dec. 22, 1994. These six applications are incorporated herein by reference.

While diamond offers substantial advantages for field emitters, there is a need for diamond emitters capable of emission at yet lower voltages. For example, flat panel displays typically require current densities of at least 0.1 mA/mm$^2$. If such densities can be achieved with an applied voltage below 25 V/μm for the gap between the emitters and the gate, then low cost CMOS driver circuitry can be used in the display. Unfortunately, good quality, intrinsic diamond cannot emit electrons in a stable fashion because of its insulating nature. To effectively take advantage of the negative electron affinity of diamond to achieve low voltage emission, diamonds need to be doped into n-type semiconductivity. But the n-type doping process has not been reliably achieved for diamond. Although p-type semiconducting diamond is readily available, it is not helpful for low voltage emission because the energy levels filled with electrons are much below the vacuum level in p-type diamond. Typically, a field of more than 70 V/μm is needed for p-type semiconducting diamond to generate an emission current density of 0.1 mA/mm$^2$.

An alternative method to achieve low voltage field emission from diamond is to grow or treat diamond so that the densities of defects are increased in the diamond structure. This method is disclosed in pending U.S. patent application Ser. No. 08/331458 filed by Jin et al. on Oct. 31, 1994. Such defect-rich diamond typically exhibits a full width at half maximum (FWHM) of 7–11 cm$^{-1}$ for the diamond peak at 1332 cm$^{-1}$ in Raman spectroscopy. The electric field required to produce an electron emission current density of 0.1 $mA/mm^2$ from these diamonds can reach as low as 12 V/μm.

Another approach is to coat a flat device substrate with ultra-fine diamond particles and then to activate the particles into low-voltage electron emitters (<12 V/μm) by hydrogen plasma heat treatment. This method is disclosed in the aforementioned application Ser. No. 08/361616.

SUMMARY OF THE INVENTION

In accordance with the present invention, a field emission device is made by pre-activating ultra-fine diamond particles before applying them to the device substrate. This initial pre-activation increases manufacturing speed and reduces cost and minimizes potential damage to the device substrate from exposure to hydrogen plasma and high temperatures.

BRIEF DESCRIPTION OF THE DRAWINGS

The nature, advantages and various additional features of the invention will appear more fully upon consideration of the illustrative embodiments now to be described in detail in connection with the accompanying drawings. In the drawings.

It is to be understood that the drawings are for purposes of illustrating the concepts of the invention and are not to scale.

DETAILED DESCRIPTION

Figure 1:
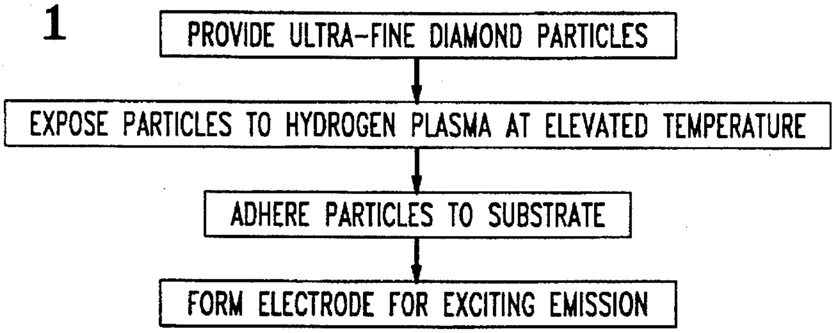
FIG. 1 is a flow diagram of a preferred process for making a field emission device in accordance with the invention.

Referring to the drawings, FIG. 1 illustrates the steps for making a low voltage field emission device in accordance with the invention. As shown in block A of FIG. 1, the first step is to provide diamond or diamond-containing particles. These particles preferably have sharp-featured geometry (polyhedral, jagged, or faceted) for field concentration during electron emission. The particles can be diamond grits, natural or synthetic, or diamond-coated (at least 2 nm thick) particles of ceramic materials such as oxides, nitrides or carbides (for example, $Al_2O_3$ AlN, WC, metal particles such as Mo, or semiconductor particles such as Si). The melting point of the particles is preferably above 1000° C. to avoid melting during plasma processing. The desired range of the particle diameters is 0.005–10 μm and preferably 0.01–1 μm. The desired sharpness of the particulate geometry is, in at least one location on each particle, less than 0.5 μm preferably less than 0.1 μm in radius of curvature.

The diamond content of the particles preferably consists predominantly of ultra-fine diamond particles. Ultra-fine diamond particles are desired not only because of the possibility of presence of emission voltage-lowering defects but also because the small radius of curvature tends to concentrate the electric field. In addition, small dimensions reduce the path length which electrons must travel in the diamond and simplify construction of the emitter-gate structure. Such ultra-fine particles, typically having maximum dimensions in the range of 5 nm to 1,000 nm, and preferably 10 nm to 300 nm, can be prepared by a number of methods. For example, a high temperature, high pressure synthesis technique (explosive technique) is used by E. I. Dupont to manufacture nanometer diamond particles sold under the product name Mypolex. The ultra-fine diamond particles may also be prepared by low pressure chemical vapor deposition, precipitation from a supersaturated solution, or by mechanical or shock-induced pulverization of large diamond particles. The diamonds are desirably uniform in size, and preferably 90% by volume have maximum dimensions between ⅓ the average and 3 times the average.

The second step, shown in block B of FIG. 1, is to activate the diamond or diamond-coated particles by exposing them to hydrogen plasma. The particles are loaded into a vacuum chamber for treatment with hydrogen plasma at elevated temperature. The plasma preferably consists predominantly of hydrogen, but it can also include a small amount of other elements, for example, carbon at less than 0.5 atomic percent and preferably less than 0.1 atomic percent. The particles are typically exposed to the plasma at a temperature in excess of 300° C., preferably in excess of 400° C. and even more preferably in excess of 500° C. for a period sufficient to produce diamond-containing emitters having an electron emission current density of at least 0.1 $mA/mm^2$ at a field strength below 12 V/μm. This period typically exceeds 30 minutes for temperature T=300° C., and diamond particle size less than 1 μm, but can be less for higher temperatures or finer particles.

Figure 2:
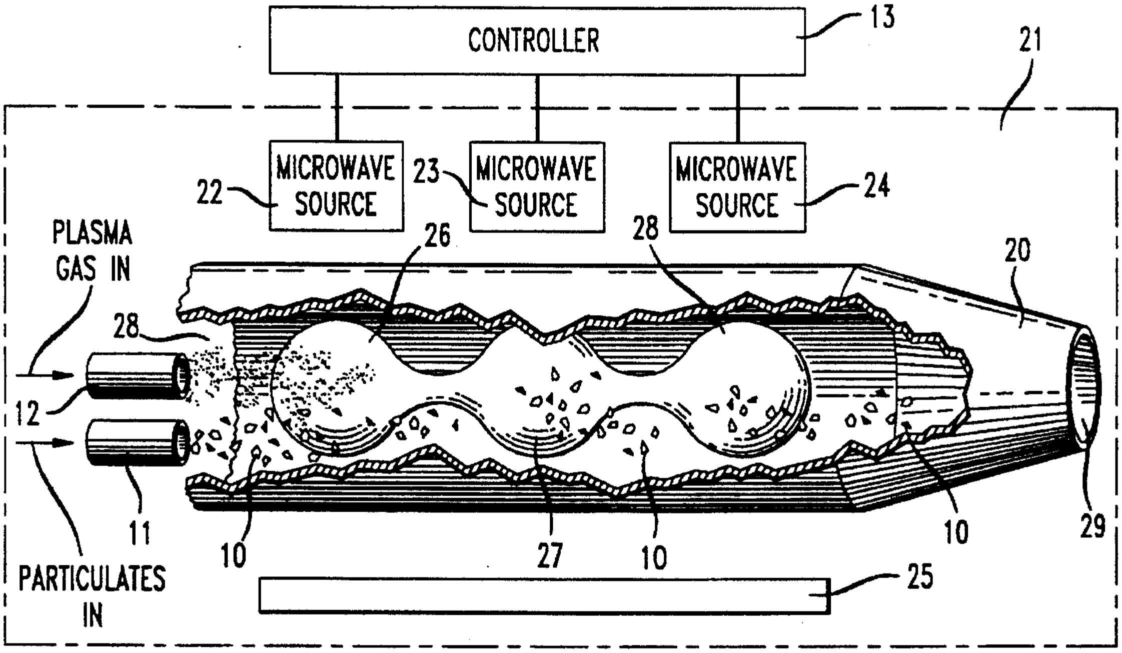
FIG. 2 schematically illustrates a first embodiment of apparatus useful for practicing the process of FIG. 1.
Figure 3:
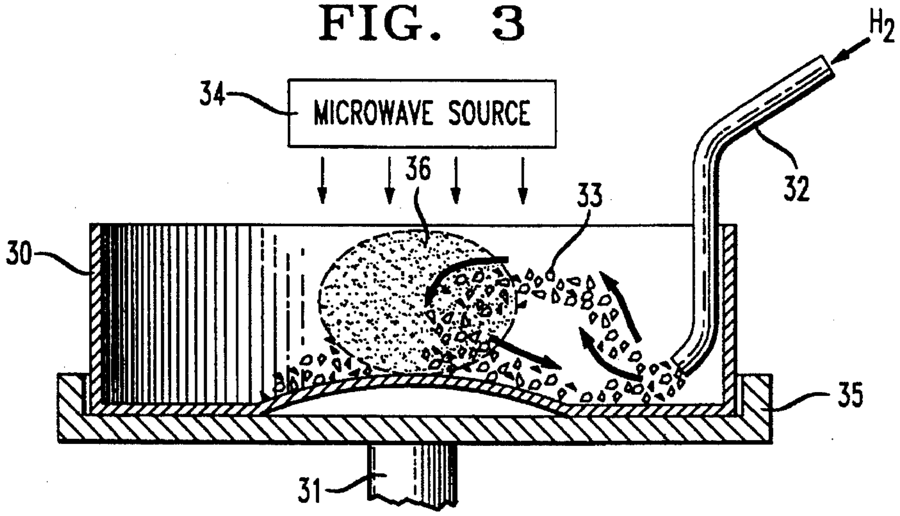
FIG. 3 illustrates a second embodiment of apparatus for practicing the method of FIG. 1.
Figure 4:
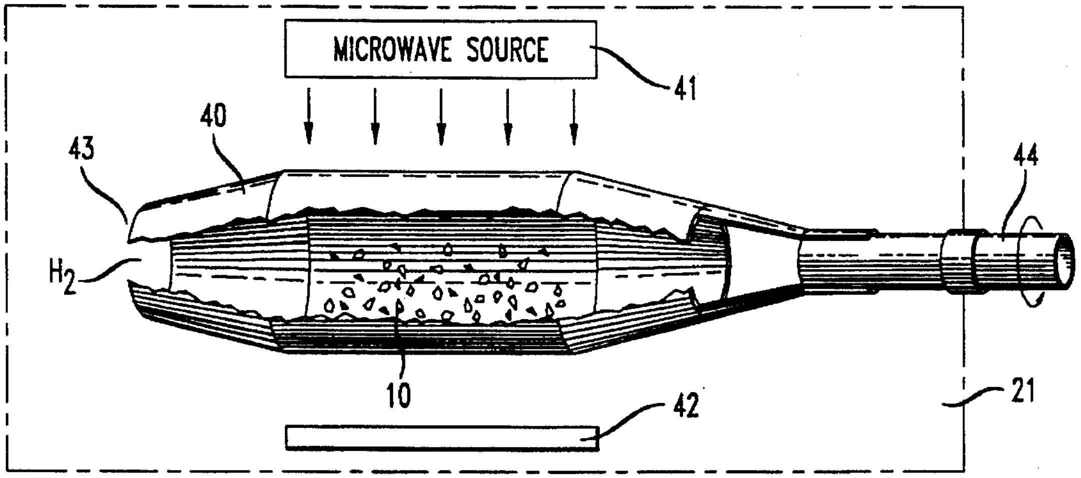
FIG. 4 illustrates a third embodiment of apparatus.

The plasma is preferably generated by microwaves, but can be excited by radio frequency (rf) or direct current (de). Other means of creating a source of activated atomic hydrogen such as using hot filaments of tungsten or tantalum heated to above 2,000° C., rf or dc plasma torch or jet, and combustion flame can also be utilized. In order to minimize agglomeration of the particles during the plasma activating processing and in order to have relative uniform activation on major part of the exposed diamond surface, it is desirable to have the particles in continuous motion so that fresh surfaces are exposed to the plasma environment and so that the particles do not sinter together. FIGS. 2, 3 and 4 show preferred apparatus for effecting such processing while the particulates are prevented from continuous contact.

FIG. 2 is a schematic cross section of a first embodiment of apparatus for activating the diamond containing particles in plasma environment. A chamber 20 is advantageously constructed of microwave-transparent material such as fused quartz tube. A plurality of separately switchable microwave sources 22, 23 and 24 are disposed along the chamber, and a microwave reflector 25 is disposed so that sources 22, 23, and 24 produce adjacent plasma regions 26, 27 and 28 along the chamber. Opening 28 is provided in the chamber 20 to permit entry of diamond particles 10 and the plasma gas (mostly hydrogen) through tubes 11 and 12, respectively. Opening 29 permits their exit. A controller 13 is provided for selectively switching microwave sources 22, 23 and 24.

In operation, the chamber is placed within an evacuated low pressure or atmospheric pressure container 21 and both the particulates and the plasma gas are flowed through. The chamber is heated to a desired temperature by radiation or other heating means (not shown). A plasma is ignited within the chamber by activating microwave sources 22, 23, 24. Movement and flow of the particulates is achieved by selectively switching off the plasma regions 26, 27 and 28. The fine particulates 10 are typically electrostatically confined within the plasma regions. When plasma region 26 is switched off, as by switching off microwave source 22, the particulates in region 26 move to adjacent region 27. Similarly, when both 26 and 27 are switched off, the particulates move to region 28. With 27 off, switching off 28 returns control of the particulates in 28 to gravity and hydrodynamic forces, removing the particles from the plasma. Thus selective switching of the plasma sources can move particulates through the plasma. Preferred operating conditions are temperature above 300° C. and preferably in the range of 500°–1000° C. Gas pressure is typically 10–100 torr and the microwave sources are about 1 KW.

FIG. 3 is an alternative embodiment where rotation of chamber 30 and the force of the plasma gas assists in moving the particulates. Specifically, rotatable quartz chamber 30 within a main chamber (not shown) is rotated by shaft 31. The gas is provided by one or more inlet tubes 32 preferably located at the periphery of chamber 30 for blowing particulates 33 toward the center of the chamber. The overall pressure is maintained by balancing injected gas with continuous pumping of the main chamber through a throttle valve (not shown). Microwave source 34 provides microwave energy to establish a plasma ball 36 at the center. Centrifugal force extended on the particulates by rotating chamber 30 moves the particles outwards, while the gas flow force drives them back to the center where they are activated. Typical operating parameters are 1 KW of microwave power, gas pressure of 10–100 torr, and rotation at 100–10,000 r.p.m.

FIG. 4 is a schematic cross section of an alternative apparatus for activation of particulates 10 comprising a longitudinally extending rotatable chamber 40 disposed within a main chamber 21. The main chamber is equipped with a microwave source 41 and a microwave reflector 42. The rotable chamber 40 is advantageously constructed of microwave-transparent material such as fused quartz and is preferably disposed between source 41 and reflector 42 so that a plasma is formed within chamber 40. Opening 43 is provided at the end of chamber 40 to permit the flow of a gas (preferably $H_2$), and the chamber is attached to a shaft 44 for rotation.

In operation, particulates 10 are loaded into chamber 40. The chamber 21 is evacuated (and optionally backfilled with hydrogen to a pressure of less than 1 atmosphere), and the rotatable chamber 40 is rotated to tumble the particulates 10. The chamber 40 is heated to a desired high temperature preferably between 500°–1000° C. by radiative or other heating methods. The microwave power is then applied to activate the particulates. Typical operating parameters are 1 KW microwave power, gas pressure of 10–100 torr, and rotation at 10–10,000 rpm.

While the exact role of the plasma treatment is not completely understood, it is believed that the hydrogen plasma cleans the diamond particle surface by removing carbonaceous and oxygen or nitrogen related contaminants and possibly introduce hydrogen-terminated diamond surface with low or negative electron affinity. The hydrogen plasma also removes any graphitic or amorphous carbon phases present on the surface and along the grain boundaries. The structure of the nanometer diamond particles is believed to be defective containing various types of bulk structural defects such as vacancies, dislocations, stacking faults, twins and impurities such as graphitic or amorphous carbon phases When the concentrations of these defects are high, they can form energy bands within the bandgap of diamond and contribute to the electron emission at low electrical fields.

Ultra-fine materials tend to contain structural defects. For diamond, one of the typical types of defects is graphitic or amorphous carbon phases. Other defects include point defects such as vacancies, line defects such as dislocations and plana defects such as twins and stacking faults. The presence of large amounts of non-diamond phases such as graphitic or amorphous material is undesirable, as they are prone to disintegration during emitter operation and are eventually deposited on other parts of the display as soot or particulates. Although the exact amount of the graphitic or amorphous impurities in these ultra-fine diamond particles are not known, the low voltage emitting diamond particles in the present invention have a predominantly diamond structure with typically less than 10 volume percent, preferably less than 2 volume percent and even more preferably less than 1 volume percent of graphitic or amorphous carbon phases within 5 nm of the surface. This predominantly diamond composition is also consistent with the fact that graphite or amorphous carbon is etched away by a hydrogen plasma processing such as described here. The pre-existing graphitic or amorphous carbon regions in the particles would be expected to be preferentially etched away, especially at the surface where the electrons are emitted, resulting in a more complete diamond crystal structure.

The diamond particles processed in accordance with the invention emit electrons typically at fields below about 12 V/μm, more typically below about 5 V/μm.

The next step shown in block C of FIG. 1 is to adhere a thin coating of ultra-fine diamond or diamond-coated particles to a substrate. The part of substrate on which the activated emitter particles are to be adhered to can be metal, semiconductor or conductive oxide. It can also be insulating in the event electrically conductive material is subsequently applied.

The preferred deposition method is direct deposition of the particles from the plasma or CVD reactor onto the substrate. The substrate is exposed to the gas containing the diamond particles, and the particles are caused to contact the substrate either by allowing the particles to settle under gravity, electrostatically charging the substrate, or impinging a high-velocity gas stream containing the diamond particles onto the substrate, and using the inertia of the particles to separate them from the gas. This direct deposition is one of the inventive aspects of this patent.

One of the alternative methods for coating the substrate is to suspend the diamond particles in a carrier liquid and apply the mixture to the substrate. The diamond particles are advantageously suspended in water or other liquid, such as alcohol or acetone (and optionally with charged surface adherent surfactants for improved particle suspension) in order to avoid agglomeration of fine particles and for easy application on flat substrate surfaces. The suspension permits application of thin, uniform coatings of diamond particles in a convenient manner such as by spray coating, spin coating, or electrophoresis. The coating desirably has a thickness less than 10 μm, preferably less than 1 μm, and more preferably, is only one layer of particles where the diamond covers 1% to 90% of the surface.

As disclosed in U.S. patent application Ser. No. 08/361616 filed by Jin et al. on Dec. 22, 1994, the diamond particles activated by hydrogen plasma are inert to ambient environment, even after exposure for months, and their low-voltage emitting characteristics are preserved. Thus, a mixing of pre-activated diamond particles with liquid and spray coating on a substrate may seem simple and trivial. However, we have discovered that such processing does not always result in desirable, low-voltage emitters unless specific processing conditions are met. One of the surprising results obtained is that pre-activated diamond particles (by hydrogen plasma treatment at 900° C./5 hrs with measured low-voltage field emission at 1.0 V/μm) lose their electron-emitting characteristics completely when the liquid used is ordinary water. A reproducible electron emission never occurred even at a high field of ~200 V/μm, and the diamond exhibited breakdown when the field was raised further. Only when the liquid is high-purity, de-ionized water or high-purity solvent (alcohol or acetone), the low-voltage emission characteristics of the activated diamond particles is retained. The exact cause for this phenomenon is not clearly understood, but it is speculated that certain impurity ions, if present in the liquid, modifies (or oxidizes) the plasma-activated surface of the diamond particles to the high work function state or non-emitting insulator state. Alternatively, it is possible that an extremely thin layer of adherent deposit, such as calcium carbonate might be deposited by the water and disrupt the field emission. It is therefore essential that high-purity, de-ionized water (e.g., resistivity>0.1MΩ·cm, and preferably >1MΩ·cm) or high-purity (>99.5%) solvent be used in order to effect the inventive method for conveniently making low-voltage emitters.

It is desirable to minimize the thermal expansion mismatch between the diamond particles and a conductive substrate for the sake of adhesion between the two. Desirably, the two thermal expansion coefficients are within a factor of 10 and preferably less than a factor of 6. For substrates whose thermal expansion substantially differs from diamond (e.g. glass or tantalum) it is advantageous for the deposited film to be less than three times the thickness of a monolayer and preferably to be a single monolayer with 1% to 60% coverage. Either the emitter layer, surface of the conductive substrate or both, are typically patterned into a desirable emitter structure such as a pattern of rows or columns so that emission occurs only from the desired regions. The carrier liquid is then allowed to evaporate or to bum off during subsequent low temperature baking process. This baking treatment may optionally be used to promote improved adhesion of the particles onto the substrate (e.g., by chemical bonding such as carbide formation at the interface) or to enhance the electron emission characteristics. A typical desired baking process is an exposure to a temperature of below ~500° C. for 0.1–100 hrs. in an inert or reducing atmosphere such as Ar, $H_2$ or hydrogen plasma environment.

Instead of suspension or direct deposition, we anticipate that the ultra-fine diamond particles can also be mixed with conductive particles such as elemental metals or alloys like solder particles together with solvents and optionally binders (to be pyrolized later) to form a slurry. In this case, the substrate can be non-conductive and the mixture can be screen printed or dispersed onto the substrate through a nozzle using the known techniques to form a desired emitter pattern. The solder (especially the low melting temperature type such as Sn, In, Sn-In, Sn-Bi, or Pb-Sn, optionally containing carbide forming elements to improve solder-diamond adhesion) can be melted to further enhance the adhesion of the diamond particles on to the cathode conductor and allow easy electrical conduction to the emitter tips. As mentioned earlier, the processing sequence or the components of materials (liquid, solid, or vapor) involved in the placement of activated diamond particles on the display surface should be carefully chosen so as not to extensively damage the low-voltage emission characteristics of the diamond particles.

The conductive layer on the surface of the substrate can be either metallic or semiconducting. It is advantageous, for the sake of improved adhesion of the diamond particles, to make the conductive layer with materials containing carbide-forming elements or their combinations, e.g., Si, Mo, W, Nb, Ti, Ta, Cr, Zr, or Hf. Alloys of these elements with high conductivity metals such as copper are particularly advantageous.

The conductive layer can consist of multiple layers or steps, and one or more of the uppermost layers of the conductive material can be discontinuous. Optionally, for the sake of improving the uniformity of emission, portions of the conductive layer away from the high-conductivity diamond particle-substrate interface can be etched away or otherwise treated to increase the impedance of these portions. Depending on the specific materials and processing conditions, field emitters can be undesirably non-uniform with pixel-to-pixel variation in display quality. In order to substantially improve display uniformity, it is desirable to add electrical impedance in series with each pixel and/or each emitter, thus limiting the emission current from the best field emitting particles. This permits other emitter sites to share in the emission and provides a more uniform display. Typical resistivity of the uppermost continuous conductive surface on which the ultrafine diamond emitters are adhered is desirably at least 1mΩ·cm and preferably at least 1Ω·cm. As an upper limit, the resistivity is desirably less than 10 KΩ·cm. In terms of surface resistivity, when measured on a scale greater than the inter-particle distance, the conductive surface has surface resistance typically greater than 1MΩ/square and preferably greater than 100MΩ/square.

Figure 5:
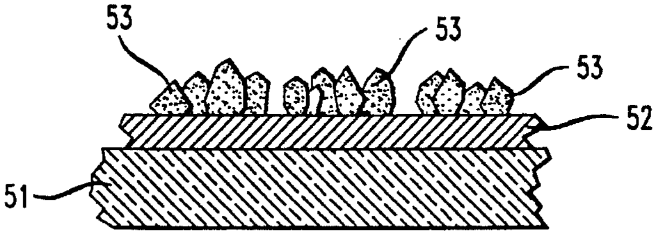
FIG. 5 schematically illustrates the structure formed after the particles are deposited on the device substrate.

FIG. 5 shows the resulting field emitter 50 after the adhesion step comprising a substrate 51 having a conductive surface 52 having a plurality of activated ultra-fine diamond emitter particles 53 attached thereto. For display applications, emitter material (the cold cathode) in each pixel of the display desirably consists of multiple emitters for the purpose, among others, of averaging out the emission characteristics and ensuring uniformity in display quality. Because of the ultra-fine nature of the diamond particles, the emitter 50 provides many emitting points, typically more than $10^4$ emitting tips per pixel of 100 μm×100 μm size assuming 10% area coverage and 10% activated emitters from 100 nm sized diamond particles. The preferred emitter density in the invention is at least $1/\mu m^2$ and more preferably at least $5/\mu m^2$ and even more preferably at least $20/\mu m^2$. Since efficient electron emission at low applied voltages is typically achieved by the presence of accelerating gate electrode in close proximity (typically about 1 micron distance), it is desirable to have multiple gate aperture over a given emitter body to maximally utilize the capability of multiple emitters. It is also desirable to have a fine-scale, micron-sized gate structure with as many gate apertures as possible for maximum emission efficiency.

The final step in making an electron field emitting device as shown in block D of FIG. 1 is forming an electrode which can be used to excite emission adjacent the diamond layer. Advantageously this electrode is a high density apertured gate structure such as described in applicants' co-pending patent application Ser. No. 08/299674. The combination of ultrafine diamond emitters with a high density gate aperture structure is particularly desirable with submicron emitters. Such a high density gate aperture structure can be conveniently achieved by utilizing micron or submicron sized particle masks. After the activated ultrafine diamond particle emitters are adhered to the conductive substrate surface, mask particles (metal, ceramic or plastic particles typically having maximum dimensions less than 5 μm and preferably less than 1 μm) are applied to the diamond emitter surface as by spraying or sprinkling. A dielectric film layer such as $SiO_2$ or glass is deposited over the mask particles as by evaporation or sputtering. A conductive layer such as Cu or Cr is deposited on the dielectric. Because of the shadow effect, the emitter areas underneath each mask particle have no dielectric film. The mask particles particles are then easily brushed or blown away, leaving a gate electrode having a high-density of apertures.

Figure 6:
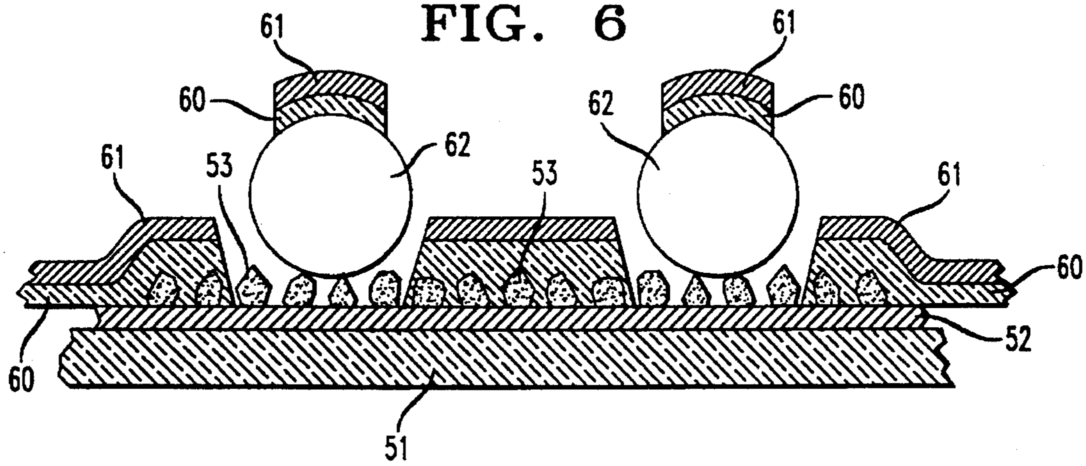
FIG. 6 schematically illustrates the device in the late stages of fabrication.

FIG. 6 illustrates the structure prior to the removal of masking particles 62. The emitter layer of activated diamond particles 53 is adhered on conductive layer 52 on substrate 51 for providing current to the emitters. Dielectric layer 60 insulates emitters 53 from apertured gate electrode 61 except in those regions covered by mask particles 62. Removal of the mask particles completes the device.

Figure 7:
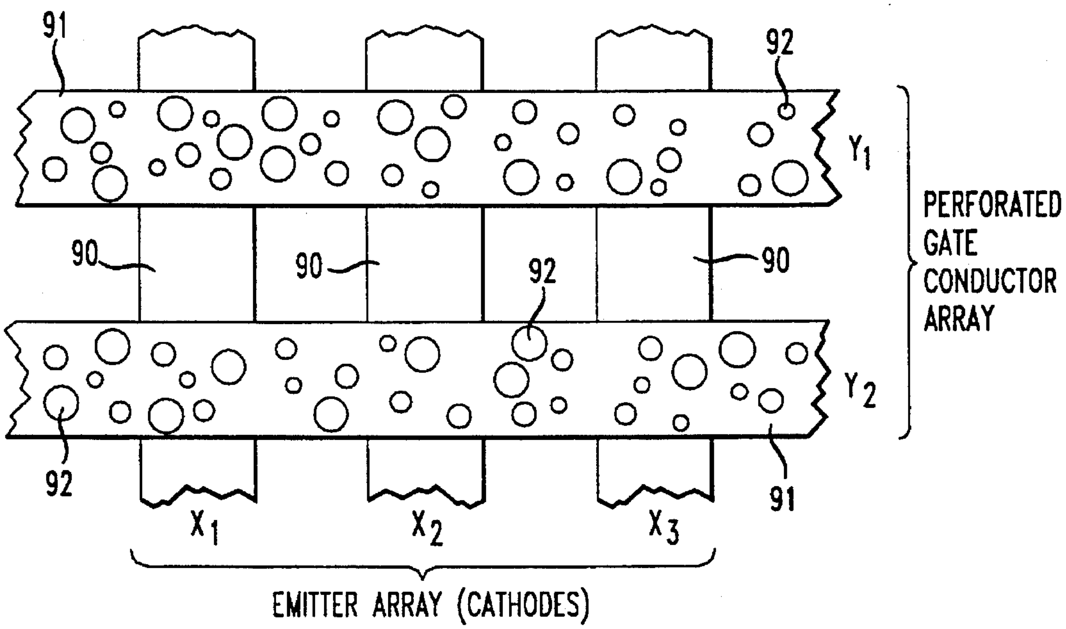
FIG. 7 is a top view showing a grid of emitter regions for a field emission device.

In typical applications the gate electrodes and emitters are deposited in skewed perpendicular stripes to define a grid of emitting regions. FIG. 7 illustrates columns 90 of an emitter array and rows 91 of an apertured gate conductor array forming an x-y matrix of emitter regions. Emission is through apertures 92. These rows and columns can be prepared by low-cost screen printing of emitter material (e.g. in stripes of 100 μm width) and physical vapor deposition of the gate conductor through a strip metal mask with, for example, 100 μm wide parallel gaps. Depending on the activation voltage of a particular column of gate and a particular row of emitter, a specific pixel can be selectively activated at the intersection of column and row to emit electrons.

Figure 8:
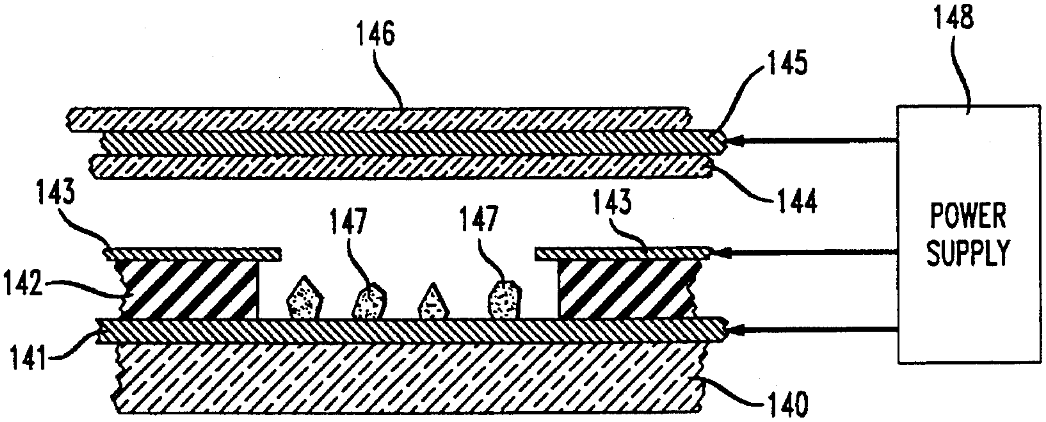
FIG. 8 is a schematic diagram of a field emission flat panel display employing the field emitters of this invention.

The preferred use of these low voltage emitters is in the fabrication of field emission devices such as electron emission flat panel displays. FIG. 8 is a schematic cross section of an exemplary flat panel display using low voltage particulate emitters. The display comprises a cathode 141 including a plurality of low voltage particulate emitters 147 and an anode 145 disposed in spaced relation from the emitters within a vacuum seal. The anode conductor 145 formed on a transparent insulating substrate 146 is provided with a phosphor layer 144 and mounted on support pillars (not shown). Between the cathode and the anode and closely spaced from the emitters is a perforated conductive gate layer 143. Conveniently the gate 143 is spaced from the cathode 141 by a thin insulating layer 142.

The space between the anode and the emitter is sealed and evacuated, and voltage is applied by power supply 148. The field-emitted electrons from electron emitters 147 are accelerated by the gate electrode 143 from multiple emitters 147 on each pixel and move toward the anode conductive layer 145 (typically transparent conductor such as indium-tin-oxide) coated on the anode substrate 146. Phosphor layer 144 is disposed between the electron emitters and the anode. As the accelerated electrons hit the phosphor, a display image is generated.

While specific embodiments of the present invention are shown and described in this application, the invention is not limited to these particular forms. For example, the low field nanometer diamond emitters can be used not only in flat panel displays but also as a cold cathode in a wide variety of other field emission devices including x-y matrix addressable electron sources, electron guns for electron beam lithography, microwave power amplifiers, ion guns, microscopes, photocopiers and video cameras. The nanometer sizes of diamond can also be extended to micron sizes if suitable methods are found to impart them with sufficient conductivity and emissive surfaces. The invention also applies to further modifications and improvements which do not depart from the spirit and scope of this invention.

We claim:

1. A method for making an electron field emission device comprising a substrate having a conductive portion, particulate electron emitters comprising diamonds and an electrode adjacent said emitters but spaced apart therefrom for exciting electron emission from said emitters upon application of voltage, said method comprising the steps of:

providing said particulate emitters comprising diamonds, said diamonds predominantly having maximum dimensions in the range of 5–10,000 nm;

prior to applying said particulate emitters to said substrate, exposing said emitters to a plasma containing hydrogen at a temperature in excess of 300° C. while moving said particulate emitters to increase emitter surface exposed and to reduce agglomeration of the emitters as compared with stationary emitters;

adhering said emitters to said substrate conductive portion by applying said emitters to said substrate conductive portion and baking said emitters on said portion at a temperature of less than 500° C. in an inert or reducing atmosphere; and disposing said electrode adjacent said emitters but spaced apart therefrom.

2. The method of claim 1 wherein said diamonds have said maximum dimensions in the range 10–1,000 nm.

3. The method of claim 1 wherein said emitters are exposed to said plasma at a temperature in excess of 500° C.

4. The method of claim 1 wherein said particulate emitters are applied to said substrate by coating said substrate with a liquid suspension containing said emitters.

5. The method of claim 4 wherein said liquid is deionized water with resistivity>0.1MΩ·cm.

6. The method of claim 4 wherein said liquid is alcohol with purity of greater than 99.5% or acetone with purity of greater than 99.5%.

7. The method of claim 1 wherein said diamonds have maximum dimensions in the range 10 nm to 300 nm.

8. The method of claim 1 wherein said particulate emitters are exposed to said plasma for a period exceeding 30 minutes.

9. The method of claim 1 wherein after the exposure to said plasma said diamonds have less than 10 volume percent of graphitic or amorphous carbon phases within 5 nm of the surface.

10. The method of claim 1 wherein said particulate emitters are adhered to said substrate in a single layer with 1% to 60% coverage.

11. The method of claim 1 wherein said diamonds are selected from the group consisting of natural diamonds and high-pressure synthetic diamonds.

12. The method of claim 1 wherein said conductive substrate comprises a carbide-forming element.

13. The method of claim 1 wherein said conductive substrate comprises a layer of solder.

* * * * *